(12) United States Patent
Menovick et al.

(10) Patent No.: US 6,354,139 B1
(45) Date of Patent: Mar. 12, 2002

(54) METHOD AND APPARATUS FOR CONDUCTING BODY LEAK TESTS ON AUTOMOTIVE VEHICLES

(76) Inventors: George P. Menovick, 32557 Wexford, Warren, MI (US) 48092; John A. Murner, 839 W. Oakridge, Ferndale, MI (US) 48220

( * ) Notice: Subject to any disclaimer, the term of this patent is extended or adjusted under 35 U.S.C. 154(b) by 0 days.

(21) Appl. No.: 09/249,883

(22) Filed: Feb. 16, 1999

Related U.S. Application Data

(60) Provisional application No. 60/074,803, filed on Feb. 16, 1998.

(51) Int. Cl.[7] .................................................. G01M 3/04
(52) U.S. Cl. ............................................................. 73/40
(58) Field of Search ......................... 134/18, 45, 56 R, 134/123; 307/41; 239/751; 73/45.5

(56) References Cited

U.S. PATENT DOCUMENTS

| | | | | |
|---|---|---|---|---|
| 3,612,075 A | * | 10/1971 | Cook | 134/90 |
| 3,693,406 A | * | 9/1972 | Tobin, III | 73/38 |
| 3,854,054 A | * | 12/1974 | Conn | 307/41 |
| 4,562,848 A | * | 1/1986 | Messing et al. | 134/123 |
| 5,016,662 A | * | 5/1991 | Cotts et al. | 134/45 |
| 5,363,868 A | * | 11/1994 | Whatley | 134/102.2 |
| 5,413,128 A | * | 5/1995 | Butts | 134/56 R |
| 5,447,574 A | * | 9/1995 | Inoue | 134/18 |
| 5,452,859 A | * | 9/1995 | Flaxman | 239/751 |

* cited by examiner

Primary Examiner—Hezron Williams
Assistant Examiner—C D Garber
(74) Attorney, Agent, or Firm—John R. Benefiel

(57) ABSTRACT

Movable spray nozzle side and overhead supports are moved by actuators to preprogrammed locations in a body leak tester enclosure to adapt the apparatus to various body configurations of automotive vehicles by a central controller. Control valves operated by the central controller may also be shut down flow to unneeded spray nozzles for smaller vehicle configurations.

7 Claims, 9 Drawing Sheets

METHOD AND APPARATUS FOR CONDUCTING BODY LEAK TESTS ON AUTOMOTIVE VEHICLES

CROSS REFERENCE TO RELATED APPLICATION

This application claims priority of provisional application 60/074,803, filed on Feb. 16, 1998.

BACKGROUND OF THE INVENTION

This invention concerns leak testing of automotive vehicles to detect body seal or body fit deficiencies which will allow rain water penetration into the passenger compartment.

Such tests are commonly conducted on prototype vehicles to detect design problems as well as on production vehicles as a quality control measure.

The standard method involves directing a powerful spray of water at vulnerable areas on the vehicle exterior, and detecting any leakage by observations made from inside the vehicle. Spray nozzles are typically arranged on an arched framework into which the vehicle is driven.

Each spray nozzle framework arrangement is dedicated to vehicles having the same approximate body size such that either the spray nozzle arrangement be manually changed or a different frame work used, requiring considerable time for changeover.

Often, less than optimum spray nozzle patterns are relied on where a single installation is used for many body sizes, reducing the reliability of the test.

It is the object of the present invention to provide a body leak detection method and apparatus which accommodates a great number of body shapes and sizes without compromising the effectiveness of the leak testing.

SUMMARY OF THE INVENTION

The above object as well as others which will become apparent upon a reading of the following specification and claims are achieved by providing an array of spray nozzles mounted on three movable structures arranged to enclose an intermediate region into which a vehicle may enter, each structure mounted for in and out movement with respect to the location where at the vehicle is to be driven. The spray nozzle arrays are juxtaposed to each of the vehicle sides and the top of the vehicle body to enable a water jet spray pattern to be directed at the sides and top of the vehicle. In addition, a fixed spray nozzle array is disposed at the bottom to direct upward water sprays at the vehicle underbody.

Actuator devices are provided for each of the movable structures, enabling in and out movement of the structures juxtaposed adjacent to the vehicle sides, and up and down movement of the overhead structure positioned over the vehicle.

A central controller operates the actuators to position movable spray nozzle arrays at preprogrammed positions corresponding to a vehicle body type to be tested, to appropriately space the nozzles from the vehicle body surfaces to obtain effective spray coverage of the areas vulnerable to leakage.

In addition, the central controller opens or closes valves controlling the flow of water to individual nozzles or grouping of nozzles to provide complete coverage of the vehicle body while not unnecessarily operating nozzles not required for a particular vehicle configuration.

The vehicle may be accurately located with respect to the spray nozzle arrays in a test enclosure by sensors such as optical beam devices notifying a tester when a vehicle has been driven to the correct point, or alternatively locator bars may be used. A mechanical sensor arm may be used to detect the side to side relative location of the vehicle with respect to the spray nozzles, and causing the side nozzle mounting structures to be correspondingly moved, or a simple target may be employed on which the test driver sights when driving the vehicle into the test enclosure.

The nozzles may be supplied with water via flexible hoses connected to fixed manifolding the hoses accommodating the in and out or up and down movement of mounting structures. Alternatively, the manifolding, valves and spray nozzles may all be mounted to a movably mounted support structure, with flexible water supply hoses to the manifolding and electrical cables to the valves.

There may also be provided swinging or tilting nozzle supports at the front and rear to place spray nozzle arrays in position to direct water sprays at the sloping windshield or rear body portions of the vehicle for more effective spray coverage.

The movable nozzle support structure may be mounted to slide in ways lined with low friction bearing material or suspended from frame members with slidable walls.

During testing, the vehicle rests on a gridwork overlying a pit collecting water runoff, water in the pit recirculated with a pump supplying pressurized water to the spray nozzle.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
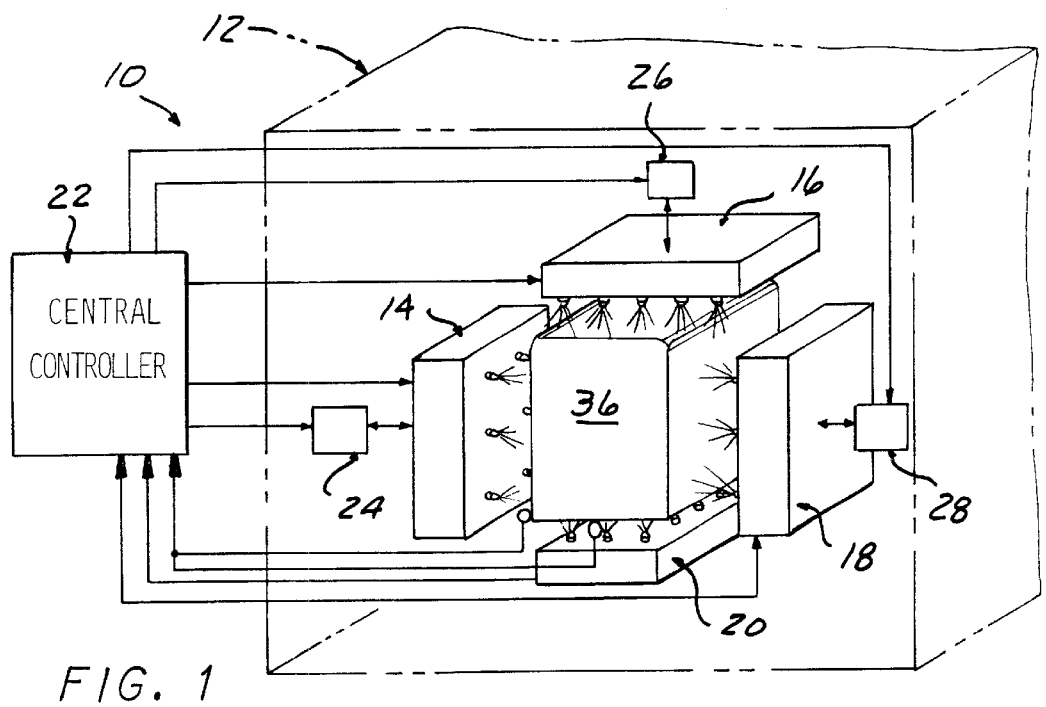
FIG. 1 is a diagrammatic representation of the basic apparatus according to the invention.

FIG. 1 comprises a conceptual diagram of the arrangement 10 according to the present invention.

A test enclosure 12 has a series of movable spray valve arrays 14, 16, 18 and a fixed bottom spray nozzle array 20.

Each of the movable spray nozzle arrays 14, 16, 18 are arranged in groupings of two sides and a top around an intermediate region, so as to define a "tunnel" space into which a vehicle 36 may be moved.

The fixed bottom spray array 20 lies beneath the floor approximately aligned with the top array 16 to complete spray coverage of the vehicle 36 to be leak tested.

A programmable industrial central controller 22 controls actuators 24, 26, 28 to cause the movable arrays 14, 18 to be moved in and out, and top nozzle array 16 to be moved up and down to be positioned at a particular distance during the test with respect to the side walls and top of vehicle 36 depending on its size.

The central controller 22 also controls water flow to the spray nozzle arrays 14, 16, 18, which may also change the spray pattern by shutting off flow to individual spray nozzles or groupings of spray nozzles, during the test particularly for smaller vehicle sizes.

Figure 3:
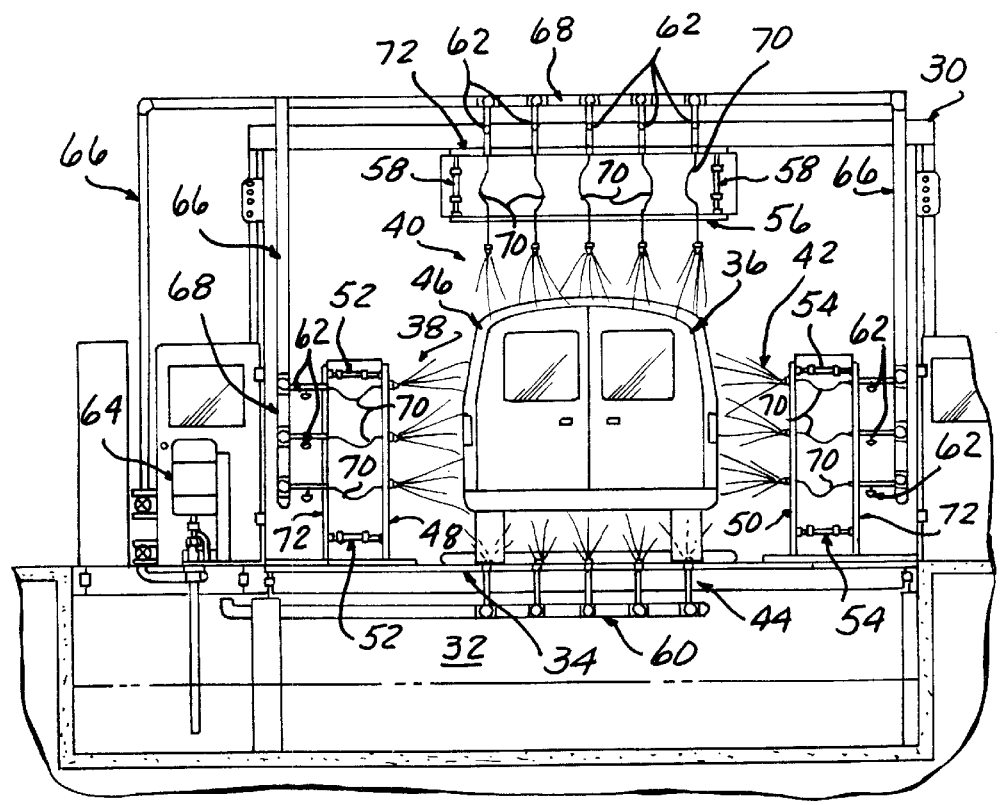
FIG. 3 is an end elevational view of the full size vehicle in the enclosure shown in FIG. 2.
Figure 2:
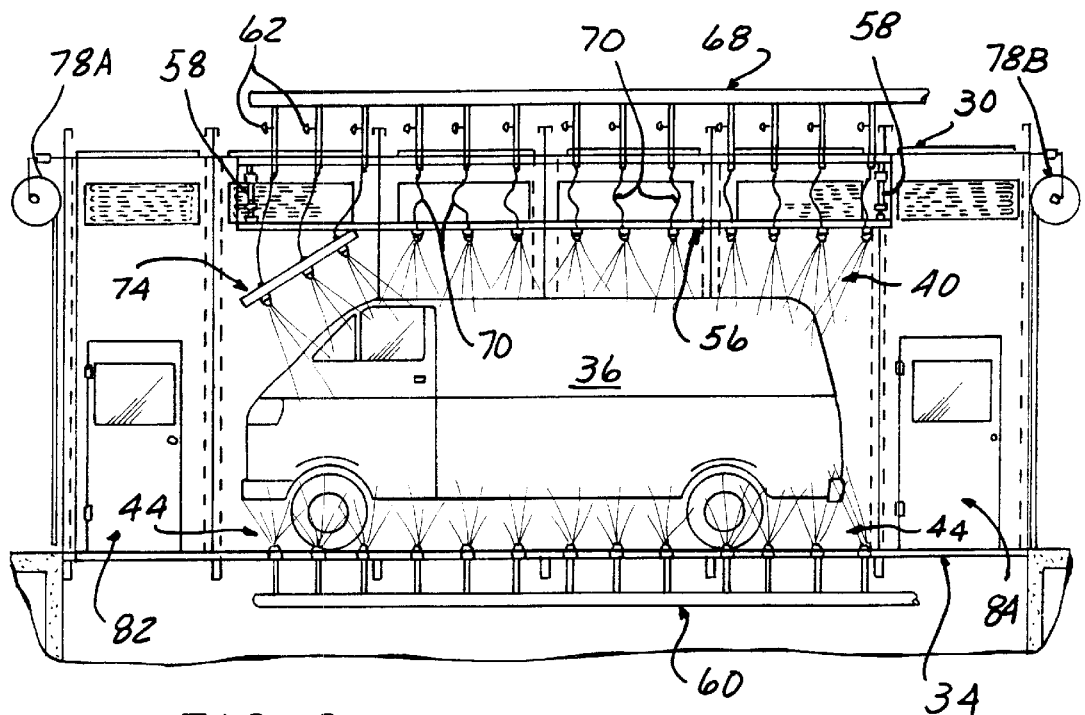
FIG. 2 is a side elevational view of a full size vehicle in a test enclosure equipped with the nozzle supports according to the present invention.

FIGS. 2 and 3 show a first embodiment of a body leak test apparatus according to the invention.

The apparatus includes a test enclosure 30 installed over a floor pit 32 covered by a floor grid 34 capable of supporting the weight of a vehicle 36 driven into the enclosure.

At least four generally planar spray nozzle arrays 38, 40, 42 and 44 are arranged around an intermediate region 46 defined within the enclosure 30. Spray nozzle supports 48, 50 are movably mounted on either side of the region 46 so that actuators 52, 54 (such as power cylinders) can slide the supporting structures 48, 50, 56 for the side spray nozzle arrays 38, 42 in and out to be spaced a greater or lesser distance apart, to be matched to wider or narrower body sizes respectively.

The top spray nozzle array 40 is mounted on a support structure 56 to be movable up and down by actuators 58.

Spray nozzle array 44 extends beneath the top array 40, fixed to a supply manifold 60 located beneath the floor grid 34.

Control valves 62 allow flow shut off of water flow to selected spray nozzles. Flexible hoses 70 connect the valves 62 to accommodate the movement of the support structures 48, 50, 56.

Fixed plates 72 mount one end of the flexible hoses 70 and anchor the actuators 52, 54, 58.

A pump 64 recirculates water collected in pit 32, directing flow through piping 66 and manifolds 68 to the various spray nozzle arrays.

Swing down spray nozzle arrays 76 (FIG. 2) can optimally be provided for the windshield area, as well as swing in arrays 76 (FIG. 4) for the rear of the vehicle 36.

Vehicle entry and exit roll up doors 78A, 78B can optionally be provided for the enclosure 30, as well as doors 82, 84 for personnel access. A single draped plastic sheeting or strips may suffice for entry and exit doors.

Figure 5:
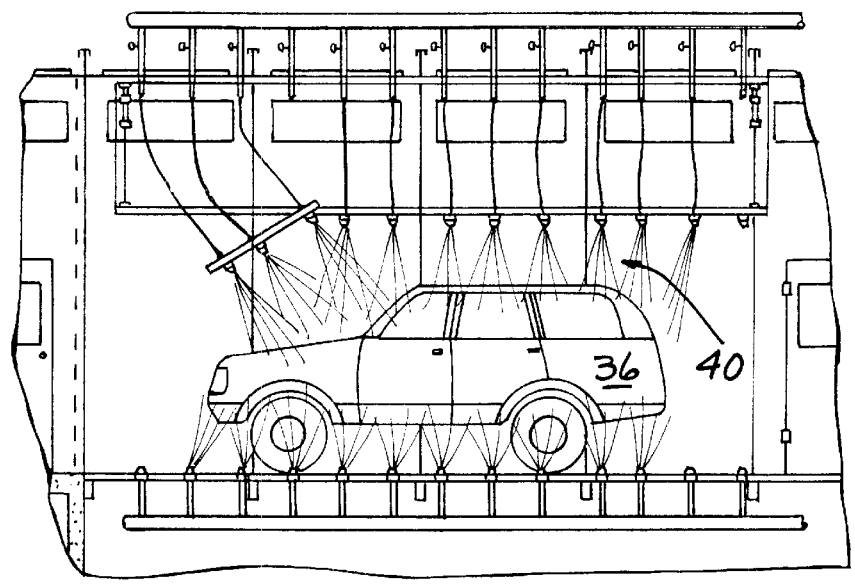
FIG. 5 is a side elevational view of a mid sized vehicle in the test enclosure shown in FIG. 2.
Figure 6:
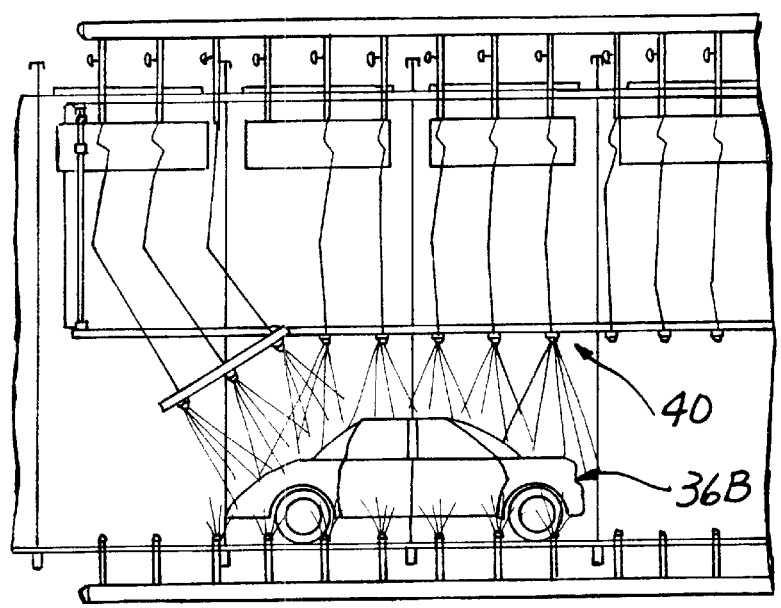
FIG. 6 is a side elevational view of a compact vehicle in the test enclosure shown in FIGS. 2–5.
Figure 7:
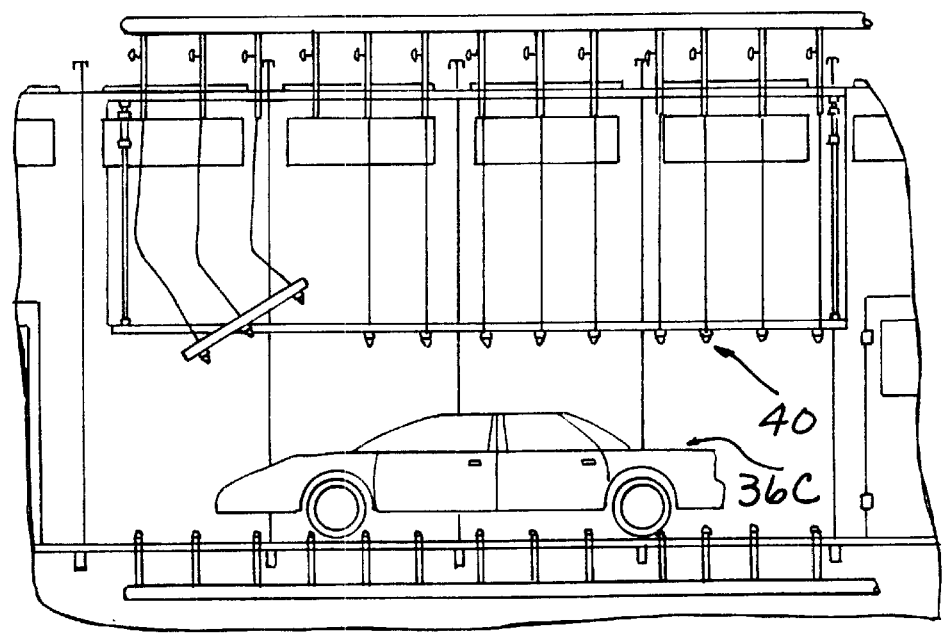
FIG. 7 is a side elevational view of a mid sized vehicle in the test enclosure shown in FIGS. 2–5.

FIG. 5–7 show various sizes of vehicles 36A, 36B, 36C in place in the test enclosure 30, with the top spray nozzle array 40 moved closer according to the control program. The side spray nozzle arrays would also be moved closer by signals generated by the central controller 22.

As a further feature, many of the spray nozzles in each of the arrays could be shut off for shorter vehicles 36B, as indicated in FIG. 6.

Figure 8:
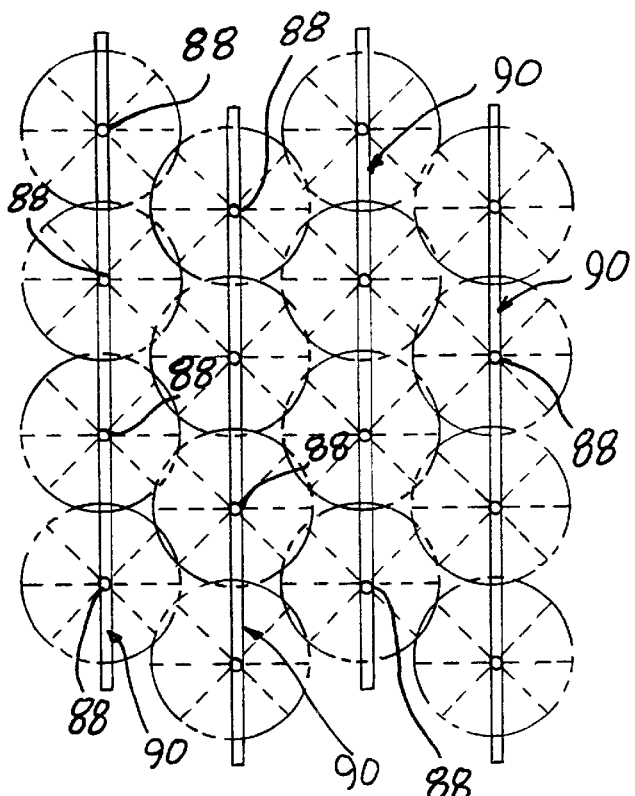
FIG. 8 is a plan view of a typical bottom/top spray pattern.

FIG. 8 shows the top and bottom spray patterns 40, 44 in which the spray nozzles 88 are in staggered rows, defined by supply pipes 90 to provide complete coverage.

Figure 9:
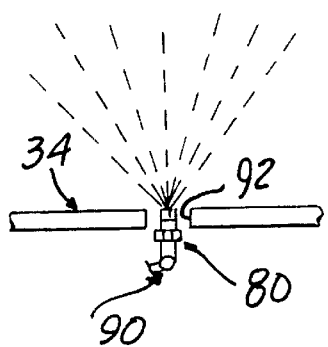
FIG. 9 is a view of a fragmentary position of a floor grid showing an opening in which an upwardly aligned spray nozzle is disposed.

FIG. 9 shows a detail of a flow spray nozzle 88 projecting up through an opening 92 provided in floor grid 34.

Figure 10:
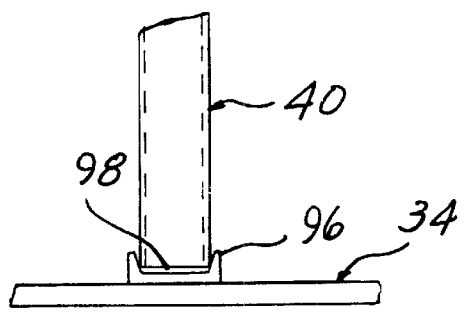
FIG. 10 is a fragmentary view of the floor grid showing a fragmentary portion of a spray nozzle support received in a guiding slide.

FIG. 10 shows a detail of a movable spray nozzle support structure 48, in which the bottom is slidable in a guide channel 96, with a Teflon® slide bearing 98 also provided.

Figure 4:
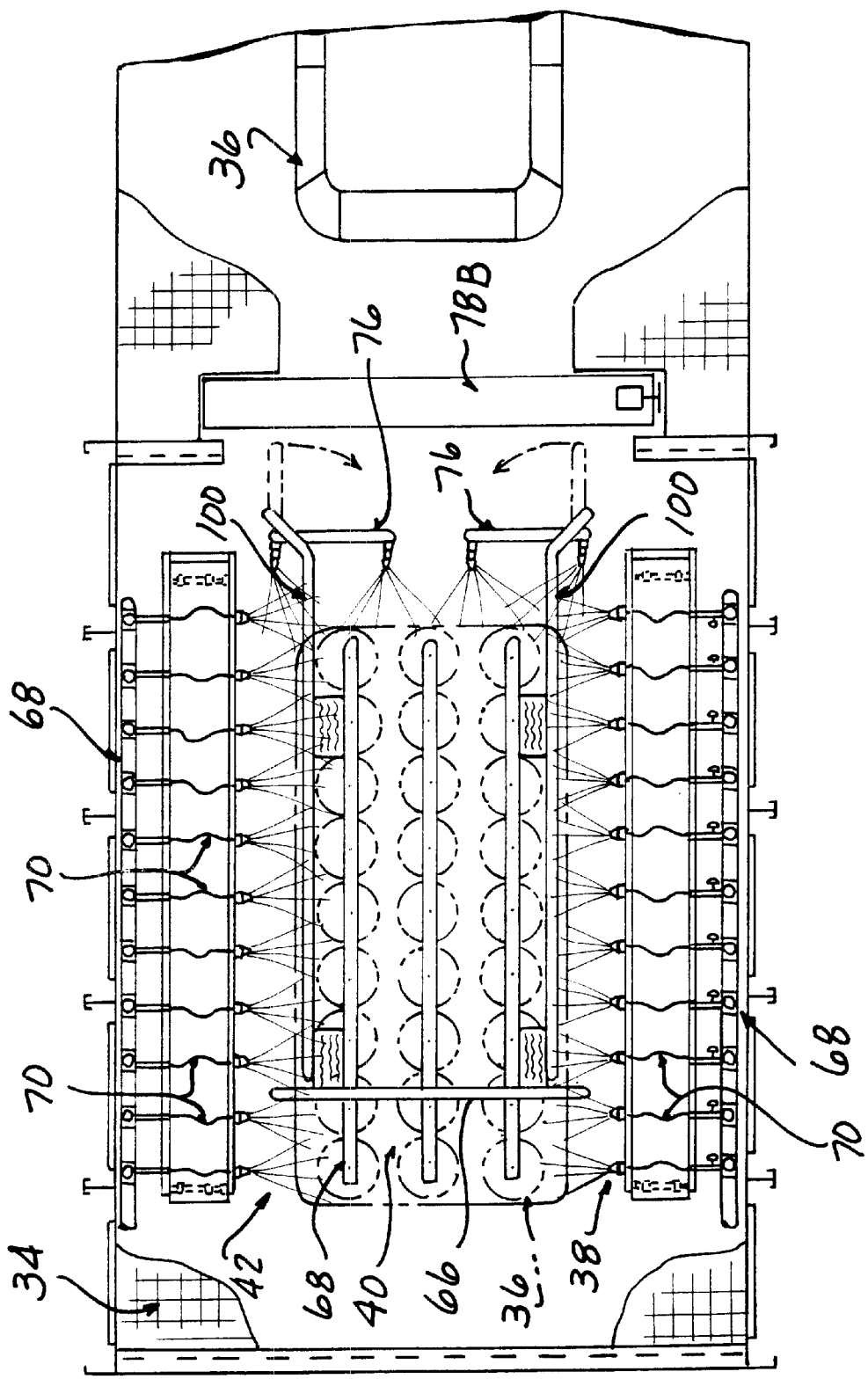
FIG. 4 is a plan view of the full size vehicle and test enclosure shown in FIGS. 2 and 3.
Figure 11:
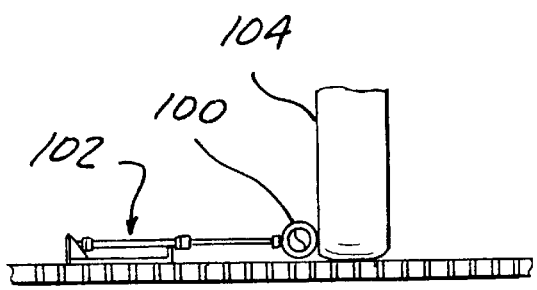
FIG. 11 is an end view of a fragmentary portion of a floor grid showing a position sensor arm in engagement with the side wall of a vehicle tire.

FIG. 11 shows an optional side position sensor, in which a tube 100 on each side are each advanced as with a power cylinder 102 to engage a vehicle tire 104 to detect the lateral location of the vehicle 36 (FIG. 4). The central controller can cause corresponding position adjustment of the side spray nozzle arrays 38, 40.

Figure 12:
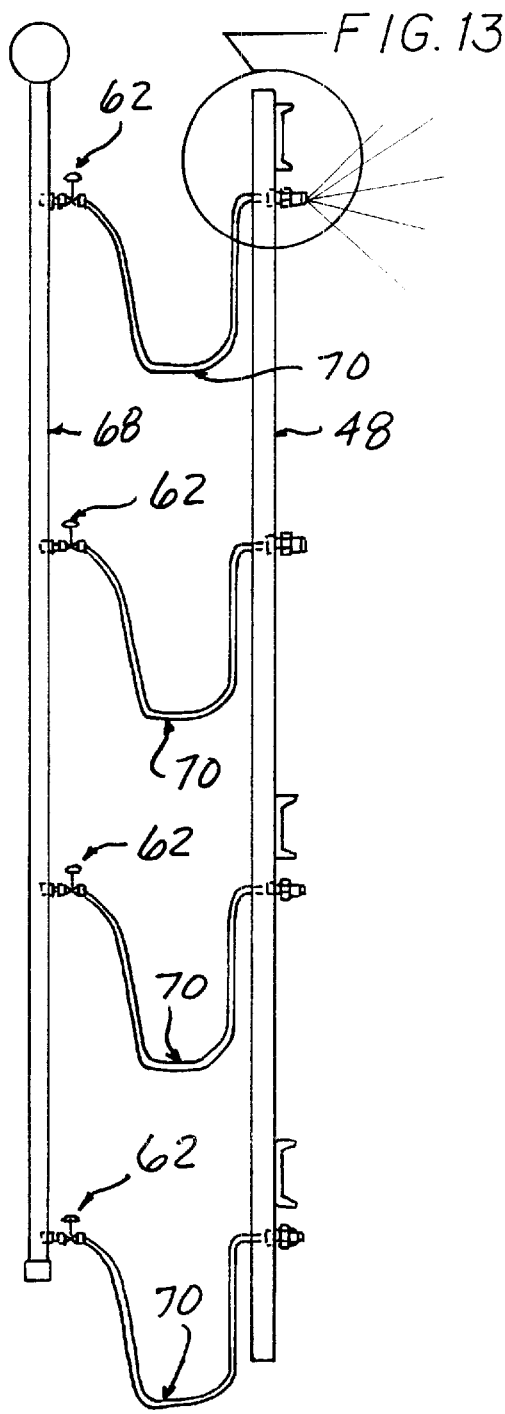
FIG. 12 is a side view of a nozzle side support and manifold.
Figure 13:
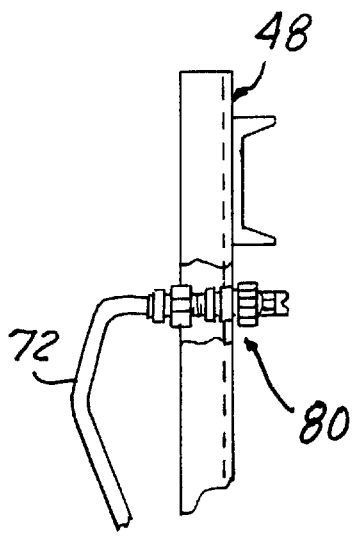
FIG. 13 is a detail view of a spray nozzle mounting.
Figure 14:
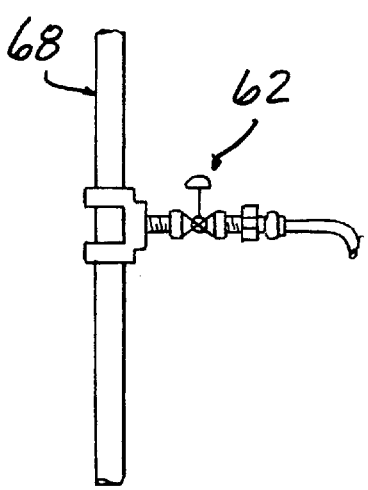
FIG. 14 is a detail of a spray nozzle valving mounting.
Figure 15:
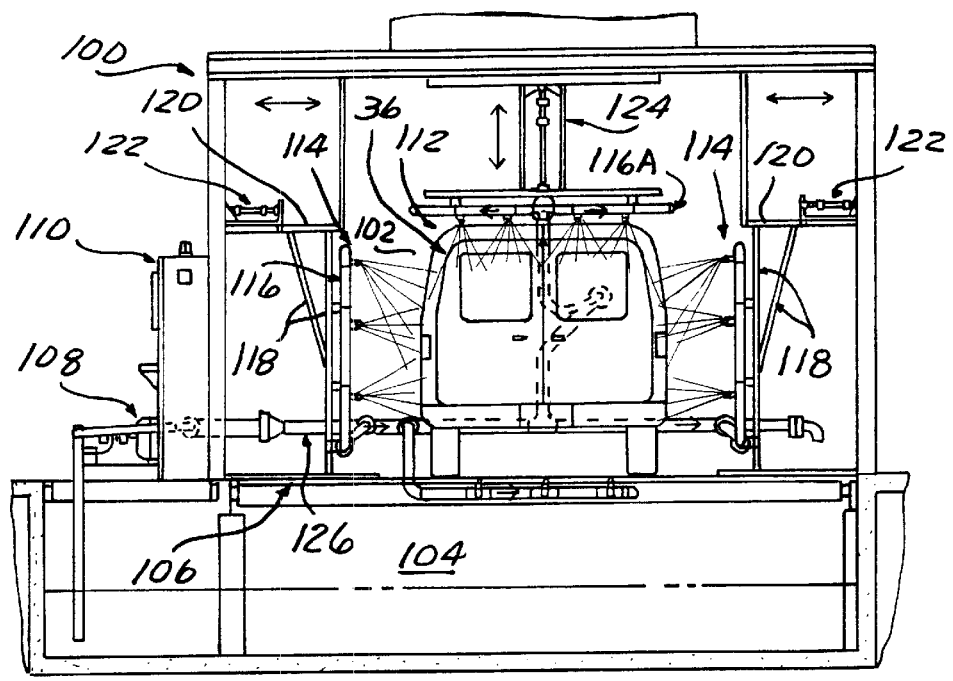
FIG. 15 is an end view of a full size vehicle in a test enclosure having water spray apparatus according to a second embodiment of the invention.
Figure 16:
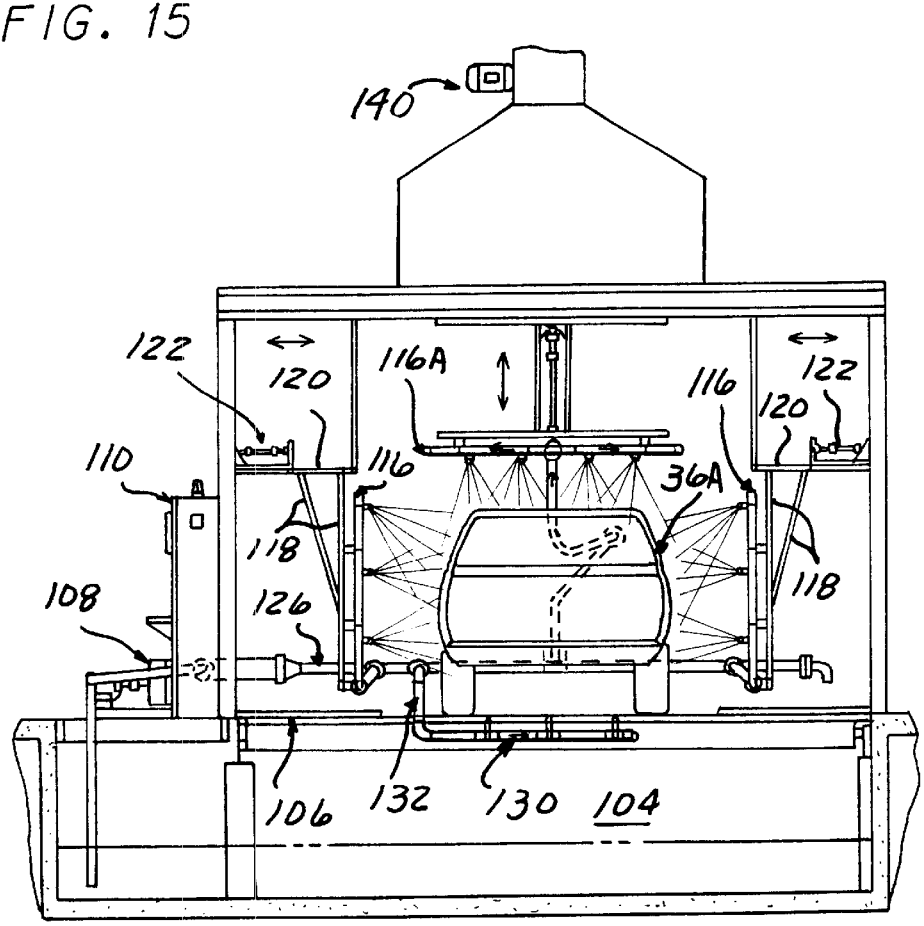
FIG. 16 is an end view of a mid size vehicle in the test enclosure of FIG. 15.
Figure 17:
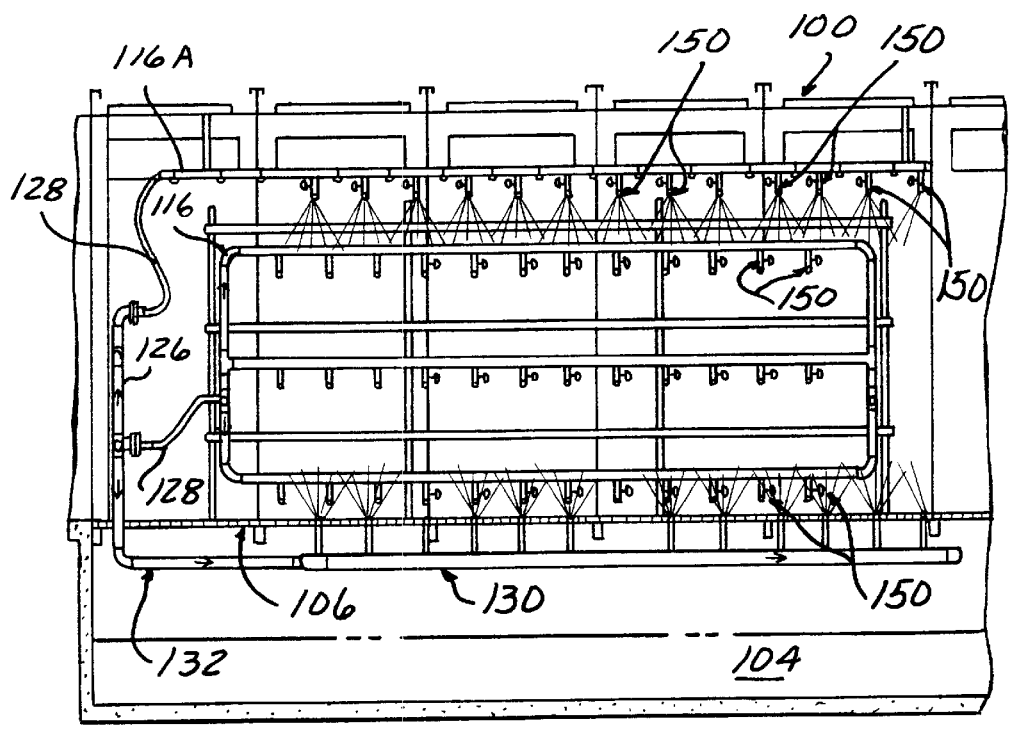
FIG. 17 is a side elevational view of the test enclosure and apparatus of FIGS. 15 and 16.
Figure 18:
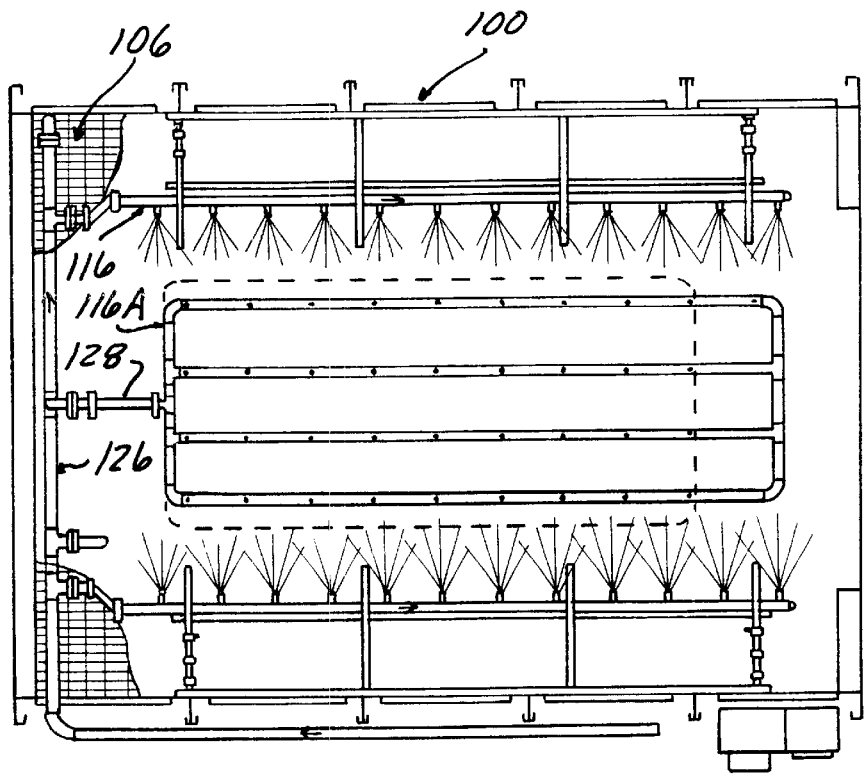
FIG. 18 is a floor plan view of the test enclosure and apparatus of FIGS. 15–17.

FIGS. 12–14 shows details of installations of the ball joint spray nozzles 80, hoses 70, valves 62.

FIGS. 15–19 show an alternate embodiment of the apparatus according to the invention.

A test enclosure 100 defines a region 102 configured to allow entry of the vehicles 36–36C of various sizes shown in FIGS. 5–7. A pit 104 is covered with an open grid 106 supporting the vehicle 36, allowing water runoff to be collected and recirculated with a pump 108.

A programmed central controller 110 operates valves 150 (FIG. 17) and actuators 122, 124 (FIG. 15, 16) as in the previously described embodiment.

In this embodiment, the manifolds, valves, and spray nozzles for the top spray nozzle array 112 and side arrays 114 are moved together as an assembly.

The manifolds 116, 116A are constructed of a lightweight plastic piping to reduce weight.

The side manifolds 116 are suspended by strut members 118 held on a linear slide 120 allowing in and out movement, actuator cylinders 122 causing the movement when operated by the central controller 110.

The top manifold 116A is movable up and down by a pair of actuator cylinders 124.

The pump 108 supplies water under pressure to distribution mains 126 which are connected to the manifolds 116, 116A by flexible hoses 128 to accommodate the in and out and up and down movement as described.

A bottom manifold 130 is fixed and supplied via connection 132.

The wiring to the control valves 150 will also have dropped sections to accommodate the movement of the nozzle arrays.

Figure 19:
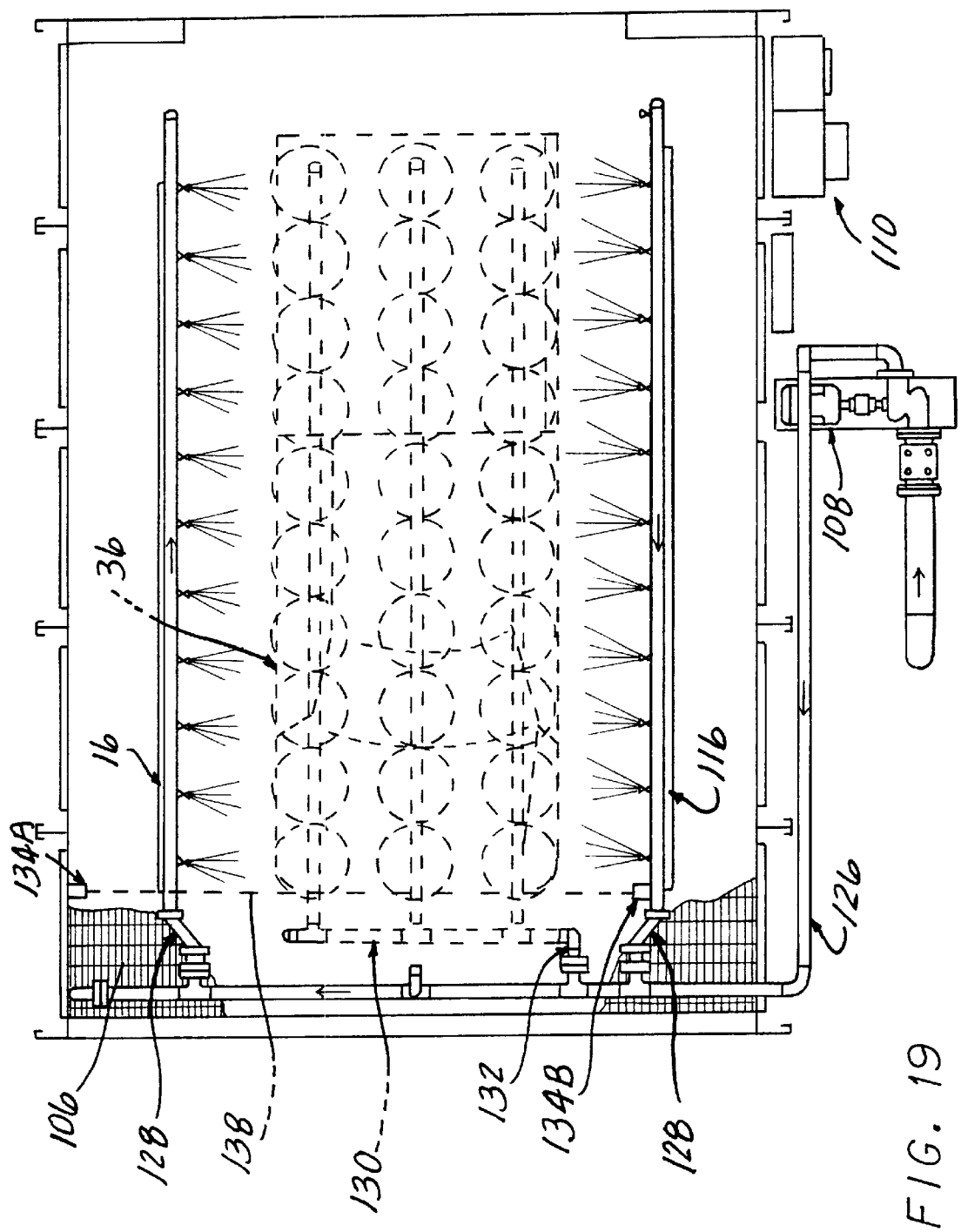
FIG. 19 is a top plan view of the test enclosure and apparatus of FIGS. 15–18.

As seen in FIG. 19, an optical beam generator and sensor units 134A, 134B detect when the vehicle 36 is driven to line 138, and a light is turned on when the vehicle moves to that line to indicate to the driver that the vehicle 36 is in proper fore and aft position. A simple target can enable the drive to correctly position the vehicle laterally.

Optical sensors (not shown) for determining vehicle type and various safety conditions will also typically be provided.

An exhaust fan hood 140 is provided.

An operating procedure is as follows:

Operator pulls vehicle into booth. Center with plumb bob/O.K. light when pulled into proper position.

Operator exits booth and closes vehicle doors.

Photo cells check vehicle model with model programmed by operator.

Operator starts test by auto sequence: side and top spray racks index to vehicle. Nozzle control valves go to position. Test in progress light starts. Pump and exhaust fan start, beginning test.

Monitor points: water flow, air flow, doors closed, filter pressure sensor, pit liquid level, test time.

Test fault conditions: Booth door opened (with alarm horn-test terminates spray racks return to home). Pit liquid low level. Pit liquid high level. Filter pressure drop high. Spray racks move during test (with alarm horn-test terminates spray racks return to home). Air flow fails. Operator manual stop (spray racks return to home).

Test complete: Pump stops, ending test. Exhaust fan runs for two minutes, after pump stop. Spray racks return to home. Door opens. Operator backs vehicle out of booth. Test in progress light stops. Vehicle guide bars index to home. Personnel door switches disengaged.

Conditions not allowed: Personnel doors opened with test in progress. Spray rack movement other than that specified for test. Testing of a vehicle other than programmed for. Any doors opened with spray racks not in home position.

Options: manual programming of system (password coded as necessary). Test status remote reporting. Booth temperature control (35° F. to 95° F.).

What is claimed is:

1. An apparatus for use in leak testing automotive vehicles comprising:

a test enclosure having side walls, a ceiling and a floor, a first spray nozzle support structure having an array of spray nozzles mounted thereon, said first spray nozzle support structure being mounted for movement towards and away an intermediate region defined within said enclosure;

a first actuator arrangement for controllably moving said first spray nozzle support structure in and out with respect to said intermediate region;

a second spray nozzle support structure in said test enclosure disposed extending across said intermediate region from said first spray nozzle support structure having an array of spray nozzles mounted thereon, said second spray nozzle support structure mounted for movement towards and away from said intermediate region;

a second actuator arrangement for controllably moving said second spray nozzle support structure towards and away from said intermediate region;

a third spray nozzle support structure in said test enclosure extending over said intermediate region and having an array of spray nozzles mounted thereon, said structure mounted for up and down movement over said intermediate region;

a third actuator arrangement for controllable moving said third structure up and down to carry said nozzle array to a higher or lower level over said intermediate region;

an opening in said test enclosure aligned with said intermediate region therein allowing entrance of an automotive vehicle and advance into a tunnel space enclosed by said nozzle arrays;

a source of pressurized water and manifolding for directing pressurized water to each nozzle in each of said nozzle arrays;

a series of spray nozzle control valves for enabling water flow to be directed to selective nozzles in said arrays;

a programmable controller having one or more programs for driving said first, second and third spray nozzle support structures to a selected one of a plurality of predetermined relative set positions during a test to generate a different planned test spray pattern for each of identified different configurations of vehicles to be tested.

2. A body leak testing apparatus as set forth in claim 1 wherein said programmable controller further includes program output signals opening particular control valves which remain open during a test for each identified configuration of vehicles to be leak tested.

3. A body leak testing apparatus as set forth in claim 1 further including locator means for locating a vehicle to be tested in said test enclosure to enable positioning said first, second and third spray nozzle support structures relative to said test vehicle to a predetermined set position during said test.

4. The apparatus according to claim 1 wherein each of said first, second and third spray nozzle support structures also carry said manifolding and said spray nozzle control valves to be moved together therewith.

5. The apparatus according to claim 4 wherein each of said first and second support structures are suspended from overhead tracks to be movable in and out.

6. A method of body leak testing a series of automotive vehicles of varying body configurations, comprising the steps of:

installing a first, second and third spray nozzle support structures within test enclosures so as to define a tunnel within said test enclosure having an array of spray nozzles mounted to said structures and arranged around said tunnel;

and driving said structures to predetermined programmed relative positions each corresponding to a respective configuration of a vehicle to be tested, whereby said spray nozzle arrangement spacing is optimized for each vehicle body configuration to be tested; and directing a flow of pressurized water through spray nozzles in said array and at said vehicles to be leak tested with said spray nozzles are in said programmed relative position while observing the interior of said vehicle for leaks.

7. A method of body leak testing as set forth in claim 6 further including the step of shutting off flow to a predetermined number of spray nozzles for at least one vehicle body configuration during said testing to reduce water flow for a small body configuration.

* * * * *

UNITED STATES PATENT AND TRADEMARK OFFICE
CERTIFICATE OF CORRECTION

PATENT NO.    : 6,354,139 B1
DATED         : March 12, 2002
INVENTOR(S)   : George P. Menovick et al.

It is certified that error appears in the above-identified patent and that said Letters Patent is hereby corrected as shown below:

<u>Column 6,</u>
Line 20, after "set positions" insert -- at the start of the test, the support structures remaining in the set position --.
Line 50, after "said tunnel;" insert -- and --.
Line 51, delete "and".
Line 58, after "nozzles are" insert -- remaining --.
Line 59, after "relative" insert -- set starting --.
Line 59, after "position" insert -- during testing --.

Signed and Sealed this

Third Day of September, 2002

*Attest:*

*Attesting Officer*

JAMES E. ROGAN
*Director of the United States Patent and Trademark Office*